United States Patent [19]
Bremer

[11] Patent Number: 5,960,400
[45] Date of Patent: Sep. 28, 1999

[54] SIGNAL TRANSFER ACCELERATION SYSTEM AND METHOD FOR ACCELERATING TRANSFER OF AN AUDIO SIGNAL THROUGH A COMMUNICATIONS CHANNEL

[75] Inventor: Gordon Bremer, Clearwater, Fla.

[73] Assignee: Paradyne Corporation, Largo, Fla.

[21] Appl. No.: 08/823,918

[22] Filed: Mar. 25, 1997

Related U.S. Application Data

[60] Provisional application No. 60/034,398, Dec. 30, 1996.

[51] Int. Cl.$^6$ ...................................................... G10L 9/00
[52] U.S. Cl. ........................................... 704/500; 704/503
[58] Field of Search .................................... 704/500, 501, 704/503, 504, 200, 211, 212, 205

[56] References Cited

U.S. PATENT DOCUMENTS

| | | | |
|---|---|---|---|
| 3,735,048 | 5/1973 | Tomsa et al. | 370/528 |
| 4,417,349 | 11/1983 | Hills et al. | 375/296 |
| 4,679,225 | 7/1987 | Higashiyama | 455/410 |
| 4,864,301 | 9/1989 | Helferich | 341/110 |
| 5,014,347 | 5/1991 | Cox et al. | 455/110 |
| 5,331,346 | 7/1994 | Shields et al. | 348/441 |
| 5,384,890 | 1/1995 | Anderson et al. | 704/200 |
| 5,559,513 | 9/1996 | Rothermel et al. | 341/61 |

*Primary Examiner*—Richemond Dorvil
*Attorney, Agent, or Firm*—Thomas, Kayden, Horstemeyer & Risley, L.L.P.

[57] ABSTRACT

A signal transfer acceleration system accelerates transfer of an audio signal through a communications channel, such as a telephone line, RF link, or other suitable audio signal communications channel. The connection along the communications channel takes much less time than would be required if the audio signal were played at its normal speed. The signal transfer acceleration system includes a specially designed transmitter system and a specially designed receiver system that are interfaced via the communications channel. The transmitter system includes: (1) a transmitter storage device configured to store the audio signal at a first sample rate; (2) a filter configured to reduce a frequency range of the signal by filtering frequencies from the signal; (3) a transmitter configured to transmit the signal along the communications channel at a second sample rate that is faster than the first sample rate so that the frequency range is expanded while a time period of the transfer is reduced. A receiver system is interfaced to the communications channel. The receiver system includes: (1) a receiver configured to receive the signal from the communications channel; (2) a receiver storage device configured to store the signal at a third sample rate that restores said frequency range; and (3) a playback mechanism configured to play the signal at the first sample rate.

24 Claims, 6 Drawing Sheets

SIGNAL TRANSFER ACCELERATION SYSTEM AND METHOD FOR ACCELERATING TRANSFER OF AN AUDIO SIGNAL THROUGH A COMMUNICATIONS CHANNEL

This document claims priority to and the benefit of the filing date of a commonly assigned copending provisional application entitled, "Method For Reduced Time Of Audio, filed Dec. 30, 1996, by the same inventor herein, and assigned Ser. No. 60/034,398.

FIELD OF THE INVENTION

The present invention generally relates to audio communications, and more particularly, to a signal transfer acceleration system and method for accelerating transfer of an audio signal through a communications channel, for example but not limited to, a telephone connection or wireless radio frequency (RF) link.

BACKGROUND OF THE INVENTION

Transcription of an audio signal involves transforming the signal from an audible sound format to a visually readable text format. Before transcription, it is sometimes necessary to transfer a recorded voice message from one location to another via a communications channel, such as a telephone line or wireless radio frequency (RF) link.

As an example, consider a transcription business that transcribes prerecorded voice messages related to the medical industry, such as a doctor's or medical worker's message regarding the medical condition of a patient. After the doctor or medical worker records the voice message, the voice message is often forwarded by the doctor to the medical transcription business over a telephone connection. However, in order to transfer the voice message over the telephone, the transmitter and receiver must be operational for the length of time corresponding with the voice message. Thus, the person that is transferring the voice message must play the message into the telephone transmitter with, for example, a tape recording device or computer, and wait until the entire message has been played out and transferred along the telephone line.

It is possible to digitize the voice message, for example, at 8,000 bits per second (bps), and then send it over a telephone line at 16,000 bps or 24,000 bps using a commercially available V.34 standard modem at both ends to approach a two to three times faster transfer time. However, this would require the use of V.34 modems, which would be an expensive proposition for many applications. Furthermore, the V.34 modems typically require about 10 to 20 seconds for initialization training time, which would adversely impact the overall transmission time and further perpetuate the problem at hand.

A heretofore unaddressed need exists in the industry for a system and method for accelerating the rate at which an audio signal is transferred along a communication channel, such as a telephone line or wireless RF link.

SUMMARY OF THE INVENTION

Briefly described, the invention provides for a signal transfer acceleration system for accelerating transfer of an audio signal through a communications channel. The connection along the communications channel takes much less time than would be required if the audio signal were played at its normal speed. The signal transfer acceleration system is akin to a lossy compression technique, and provides a fully satisfactory intelligible audio signal for transcription or other purposes.

The system is implemented as follows. In general, a specially designed transmitter system and a specially designed receiver system are interfaced via a communications channel, such as a telephone line, RF link, or other suitable audio signal communications channel. The transmitter system includes: (1) a transmitter storage device configured to store the audio signal at a first sample rate ($r_1$); (2) a filter configured to reduce a frequency range of the signal by filtering frequencies from the signal; (3) a transmitter configured to transmit the signal along the communications channel at a second sample rate ($r_2$) that is faster than the first sample rate so that the frequency range is expanded while a time period of the transfer is reduced. In the preferred embodiment, the second sample rate is equal to the first sample rate multiplied by an acceleration value (A) that is greater than one.

A receiver system is interfaced to the communications channel. The receiver system includes: (1) a receiver configured to receive the signal from the communications channel; (2) a receiver storage device configured to store the signal at a third sample rate ($r_3$) that restores the frequency range; and (3) a playback mechanism configured to play the signal at the first sample rate. In the preferred embodiment, the third sample rate is equal to the inverse of the acceleration value multiplied by the second sample rate.

In accordance with another feature of the invention, variable acceleration values (A) can be employed. When variable acceleration values are employed, the transmitter system can advise the receiver system of the acceleration value A that has been utilized by the transmitter system by encoding the first sample rate and/or the third sample rate in the transmitted signal, for example, in a dual tone multi-frequency format (DTMF).

The present invention can also be viewed as a method for accelerating transfer of an audio signal through a communications channel. The methodology can be broadly summarized as follows: (a) storing the audio signal at a first sample rate; (b) reducing a frequency range of the signal by filtering frequencies from the signal; (c) transmitting the signal along the communications channel at a second sample rate that is faster than the first sample rate so that the frequency range is expanded while a time period of the transfer is reduced; (d) receiving the signal from the communications channel; (e) storing the signal at a third sample rate that is equal to an inversion of the second sample rate; and (f) playing the signal at the first sample rate.

The invention has numerous advantages, a few of which are delineated hereafter, as merely examples.

An advantage of the invention is that it permits transfer of a prerecorded audio file over a standard telephone line or other communications link in much less time, for example, at half the time duration, of the file recordation time and permits intelligible reproduction of the file at the receiver site.

Another advantage of the invention is that it is suitable for one way and two way audio communications. As an example of two way audio communications, the invention can be employed in connection with simultaneous voice and data (SVD) techniques, such as those corresponding with ITU Recommendation V.11, which produces duplex audio communications over a telephone channel.

Another advantage of the invention is that it can be used in connection with either audio data communications or concurrent audio and data communications.

Another advantage of the invention is that it can be implemented in hardware, software, or a combination thereof.

Another advantage of the invention is that it can be implemented in a conventional multimedia computer.

Another advantage of the invention is that it can be implemented in a conventional tape recorder.

Another advantage of the invention is that it is simple in design, yet reliable in operation.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

FIGS. 3A and 3B show an electronic block diagram of a first embodiment of the signal transfer acceleration system of FIG. 1, wherein computer based transmitter and receiver systems are utilized to communicate over a communications channel; specifically.

DETAILED DESCRIPTION OF THE PREFERRED EMBODIMENTS

Figure 1:
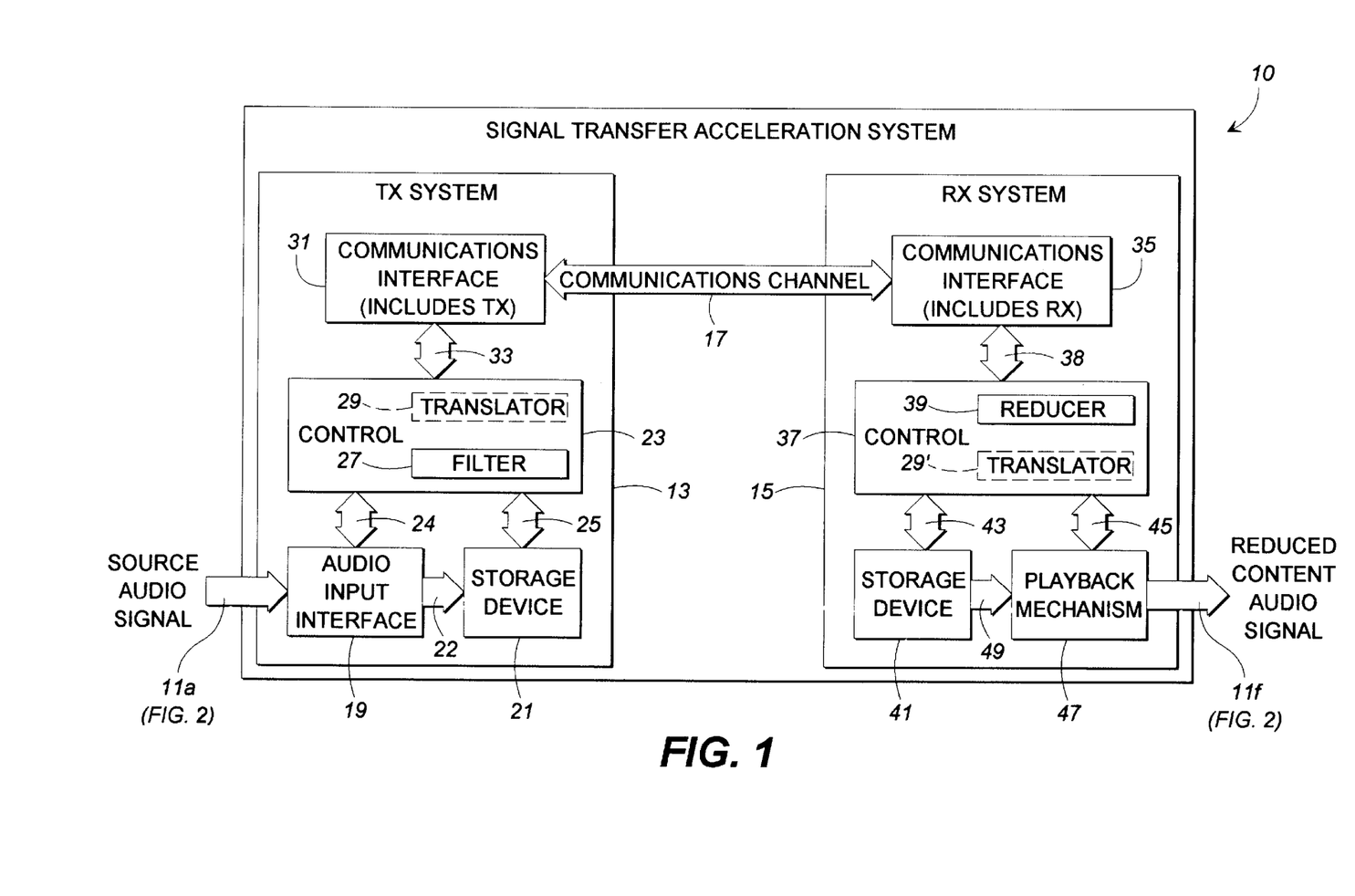
FIG. 1 is an electronic block diagram showing a first embodiment of the signal transfer acceleration system and method of the invention.

A signal transfer acceleration system 10 in accordance with the present invention is shown in FIG. 1 by way of an electronic block diagram. With reference to FIG. 1, the signal transfer acceleration system 10 accelerates transfer of a source audio signal 11a (also, see signal 51 in FIG. 2; for purposes of simplicity, the effects of attenuation have not been illustrated in the graph of FIG. 2) from a transmitter system 13 to a receiver system 15 over a communications channel 17, for example but not limited to, a telephone channel, RF link, or other suitable audio signal communications channel. The receiver system 15 is configured to produce a reduced content audio signal 11f (also, see signal 56 in FIG. 2) that corresponds substantially to the source audio signal 11a in terms of intelligibility for purposes of transcription or other suitable uses.

In architecture, the transmitter system 13 includes an audio input interface 19, for example, a microphone, telephone receiver, etc., configured to receive the source audio signal 11a and to encode the source audio signal 11a into an electrical format, either analog or digital, as indicated by reference arrow 22. A storage device 21 is configured to receive the electrically encoded source analog signal 22 from the audio input interface 19. The storage device 21 can be any suitable storage device, including but not limited to, a device that stores data on a magnetic medium, an optical medium, etc.

A control mechanism 23 is designed to control the audio input interface 19 and the storage device 21, as indicated by reference arrows 24, 25, respectively. The control mechanism 23 can be implemented with any suitable software, hardware, or a combination thereof. The control mechanism 23 includes a filter 27 that is configured to reduce a frequency range of the audio signal 11a by utilizing frequency filtering, for example, a band pass filter in order to produce a filtered audio signal 11b (signal 52 in FIG. 2). In the preferred embodiment, the frequency range is reduced to at least half of the bandwidth (bw) of the channel 17.

Figure 2:
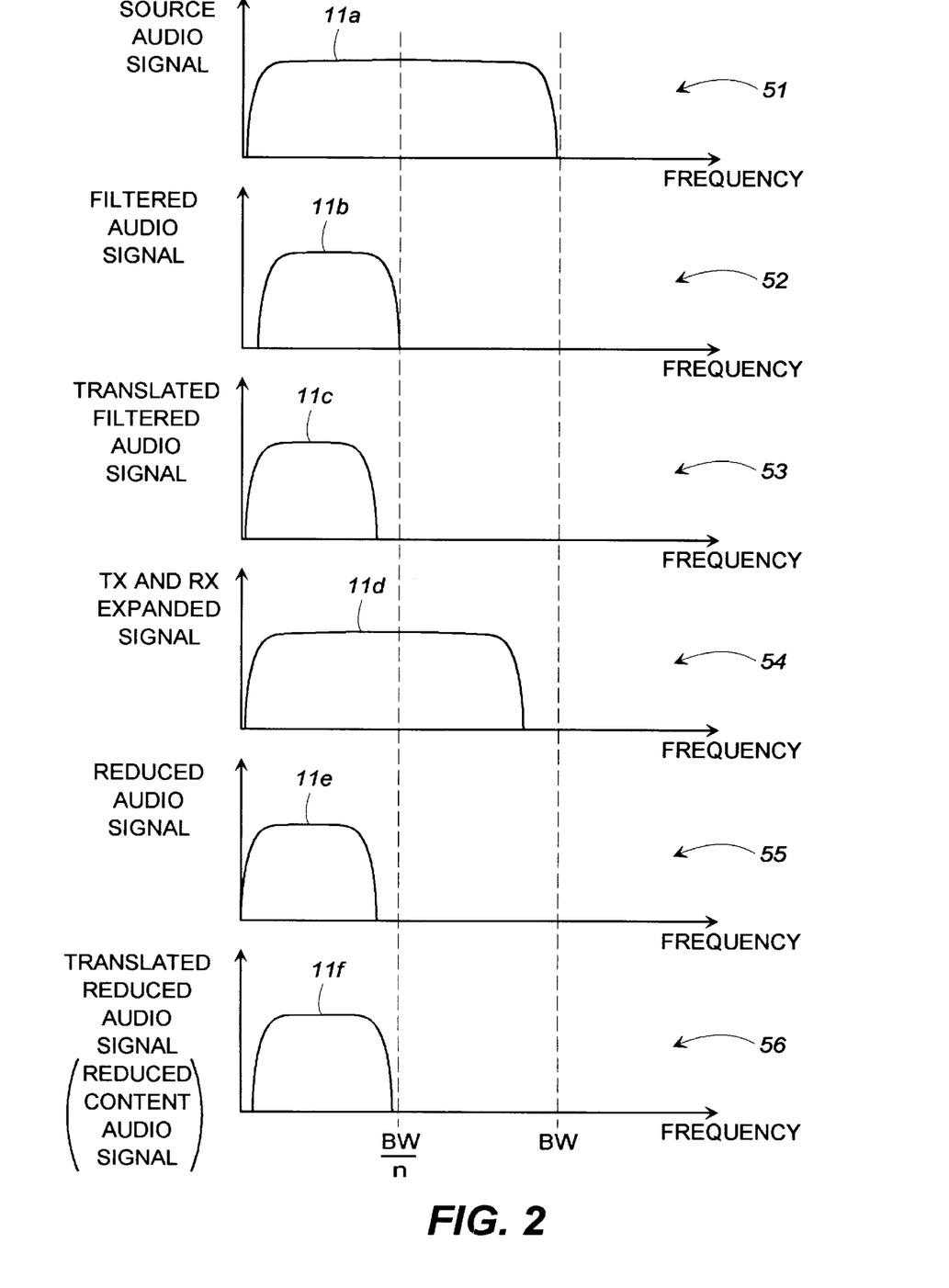
FIG. 2 is a graph showing the processing of an audio signal by the transmitter and receiver systems of FIG. 1.

Optionally, the control mechanism 23 may further include a translator 29 for shifting the frequency range of the audio signal 11a after the filtering process performed by the filter 27 in order to generate a translated filtered analog signal 11c (signal 53 in FIG. 2). If the transmitter system 13 utilizes a translator 29, then the receiver system 15 should also utilize a corresponding translator 29' to effectively nullify the shift caused by the transmitter's translator 29.

The transmitter system 13 of FIG. 1 further includes a communications interface 31. The communications interface 31 can be any suitable device for communicating the audio signal 11b or 11c to the channel 17, including but not limited to, a telephone transmitter, an RF transceiver or transmitter, etc. The communications interface 31 is controlled by the control mechanism 23, as indicated by reference arrow 33, and is adapted to transfer the audio signal 11a onto the communications channel 17 at a rate that is faster than the rate at which the source audio signal 11a was received and/or recorded in the storage device 21.

In the preferred embodiment, assuming that the signal 11a was received and/or recorded at a first sample rate, then the communications interface 31 transmits the signal 11b or 11c at a second sample rate that is about twice the first sample rate. As a result, the frequency spectrum of the signal is expanded, while transmission duration is significantly reduced. In the preferred embodiment, the signal 11c is transformed into an expanded signal 11d (signal 54 in FIG. 2). If signal 11b were transmitted, the resulting expanded signal would look similar to signal 11d, but shifted higher in frequency.

The receiver system 15 includes a communications interface 35 for receiving the audio signal 11d from the communications channel 17. The communications interface 35 can be any suitable receiving device, including but not limited to, a telephone receiver, a wireless RF transceiver or receiver, etc.

The receiver system 15 further includes a control mechanism 37 that controls the elements of the receiver system 15 and receives the audio signal 11d from the communications interface 35. The control mechanism 37 can be implemented with any suitable software, hardware, or a combination thereof. The control mechanism 37 includes a reducer 39 for reducing the speed at which the expanded audio signal 11d was received by the communications interface 35 in order to produce a reduced audio signal 11e (signal 55 in FIG. 2). The expanded signal 11d may be either processed by the reducer 39 and then stored in a storage device 41 or stored initially in the storage device 41, then retrieved and processed by the reducer 39, and then restored in the storage device 41 at the reduced speed. Note that reducing the speed of the signal 11d reduces the frequency range of the signal 11d.

Optionally, the control mechanism 37 may further include a translator 29' for shifting the frequency range of the reduced audio signal 11e, when the transmitter system 13 includes a counterpart translator 29. When utilized, the translator 29' produces a translated reduced audio signal 11f (signal 56 in FIG. 2).

The receiver system 15 further includes a suitable storage device 41 that is controlled by the control mechanism 37, as indicated by reference arrow 43. The storage device 41 may be a device for storing data on a magnetic medium, an optical medium, etc.

A playback mechanism 47 in the receiver system 15 is controlled by the control mechanism 37, as indicated by reference arrow 45, and is designed to retrieve any stored signals 11d, 11e, 11f (signals 54–56 in FIG. 2) in the storage device 41 as indicated by reference arrow 49. The playback mechanism 47 may be, for example but not limited to, a computer sound card, an audio amplifier or preamplifier, a tape recorder, a telephone interface, an interface to another communications channel, etc., or a combination of the foregoing components.

In operation, the signal transfer acceleration system 10 of FIG. 1 functions as follows. Referring to FIG. 1, the transmitter system 13 receives the source audio signal 11a (signal 51 in FIG. 2) at a first sample rate. The signal 11a is transferred at the first sample rate either to the control mechanism 23 for immediate processing or to the storage device 21 for storage and future processing by the control mechanism 23.

Next, the signal 11a is filtered by the filter 27 to produce a filtered audio signal 11b (signal 52 of FIG. 2). The filtered audio signal 11b may be stored once again within the storage device 21, or alternatively, transferred immediately through the remainder of the system 13 and onto the communications channel 17 without prior storage. Preferably, although not necessary, the filtered audio signal 11b is shifted in frequency by the optional translator 29 to produce a translated filtered audio signal 11c (signal 53 in FIG. 2). The translated filtered audio signal 11c may be stored in the storage device 21, or alternatively, transferred immediately to the communications interface 31 for placement on the communications channel 17 without prior storage.

When the signal 11c is received, the communications interface 31 transmits the translated filtered audio signal 11c onto the communications channel 17 at a second sample rate that is faster than the first sample rate. In the preferred embodiment, the second sample rate is twice as fast as the first sample rate so that the frequency range of the translated filtered audio signal 11c is effectively doubled, while residing within the bandwidth of the channel 17, to produce a signal 11d (signal 54 in FIG. 2). In other words, the transmitted signal 11c is expanded in the frequency domain, while the time period for transmission along the communications channel 17 is significantly reduced.

After the communications interface 35 at the receiver system 15 receives the signal 11d, the communications interface 35 may transfer the signal 11d immediately to the storage device 41 for further processing in the future, or alternatively, the communications interface 35 may immediately forward the signal to the control mechanism 37 for immediate processing.

Next, the reducer 39 within the control mechanism 37 reduces the speed of the signal 11d in order to produce a reduced audio signal 11e (signal 55 in FIG. 2). In the preferred embodiment, the reducer 39 retrieves the signal 11d from the storage device 41 and stores the signal 11d at a third sample rate, which is essentially an inversion of the second sample rate, so as to produce the reduced audio signal 11e. In other words, if the second sample rate equals three times the first sample rate, then the third sample rate will equal one-third of the first sample rate.

Further, if the transmitter system 13 translated the signal, then the receiver system 15 should also translate the signal to correct for the translation. In this regard, the reduced audio signal 11e is shifted along the frequency domain to produce the reduced content audio signal (translated reduced audio signal; signal 56 in FIG. 2) 11f using the receiver system translator 29'. The reduced content audio signal 11f can be used by a transcriber to produce the necessary text corresponding with the original source audio signal 11a, even if the translators 29, 29' are not precisely in synchronization. Moreover, although the signal 11f includes less data than the original source audio signal 11a, the signal 11f is completely intelligible by a transcriber.

First Embodiment

A first embodiment of the signal transfer acceleration system 10 (FIG. 1) will now be described with reference to FIGS. 3A and 3B, and is generally denoted by reference numeral 10'. The first embodiment is merely an example of an implementation. In this regard, FIG. 3A shows a computer based transmitter system 13, and FIG. 3B shows a computer based receiver system 15, which when interfaced form the system 10'.

Figure 3A:
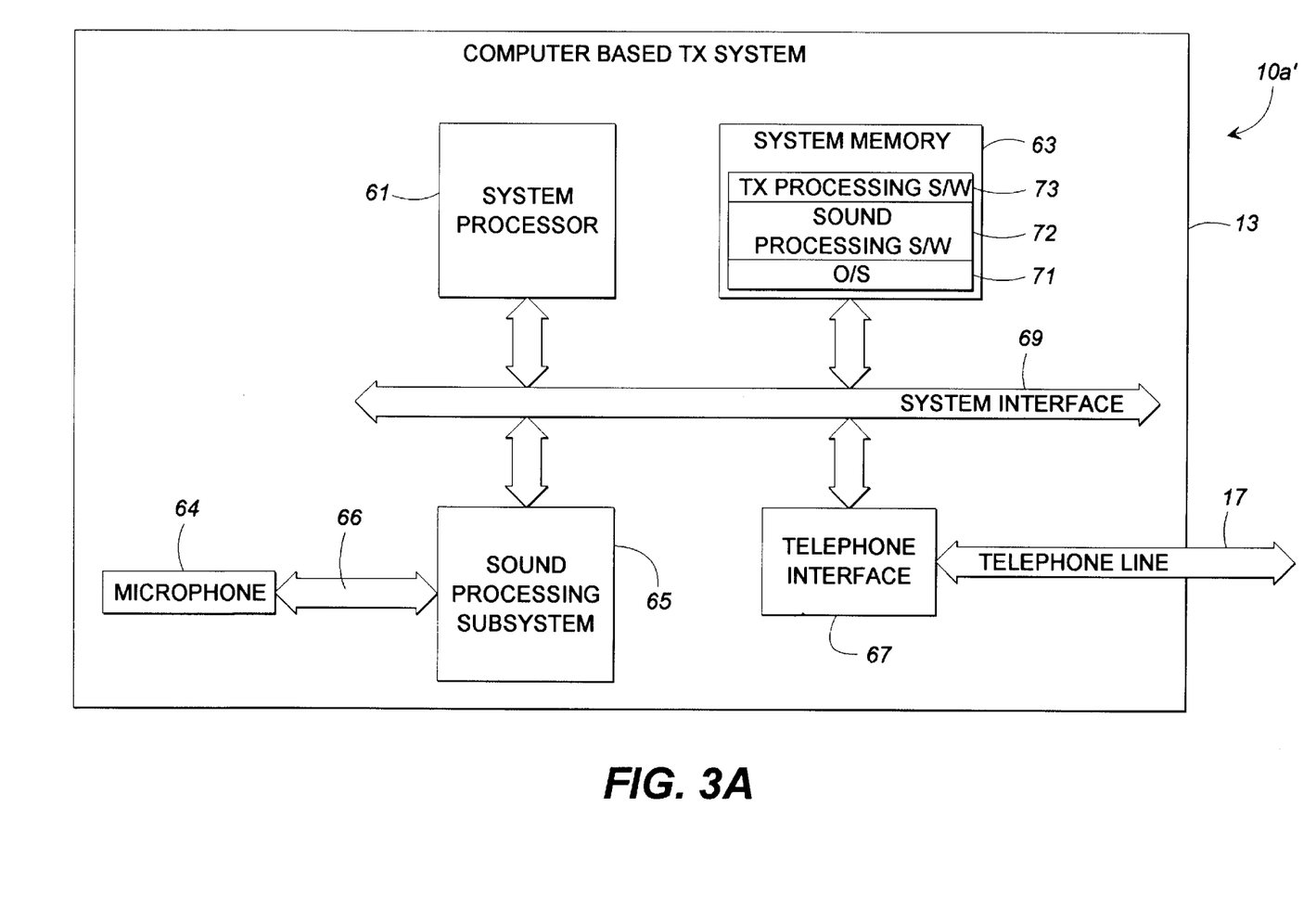
FIG. 3A is an electronic block diagram showing a possible implementation of a computer based transmitter system.
Figure 3B:
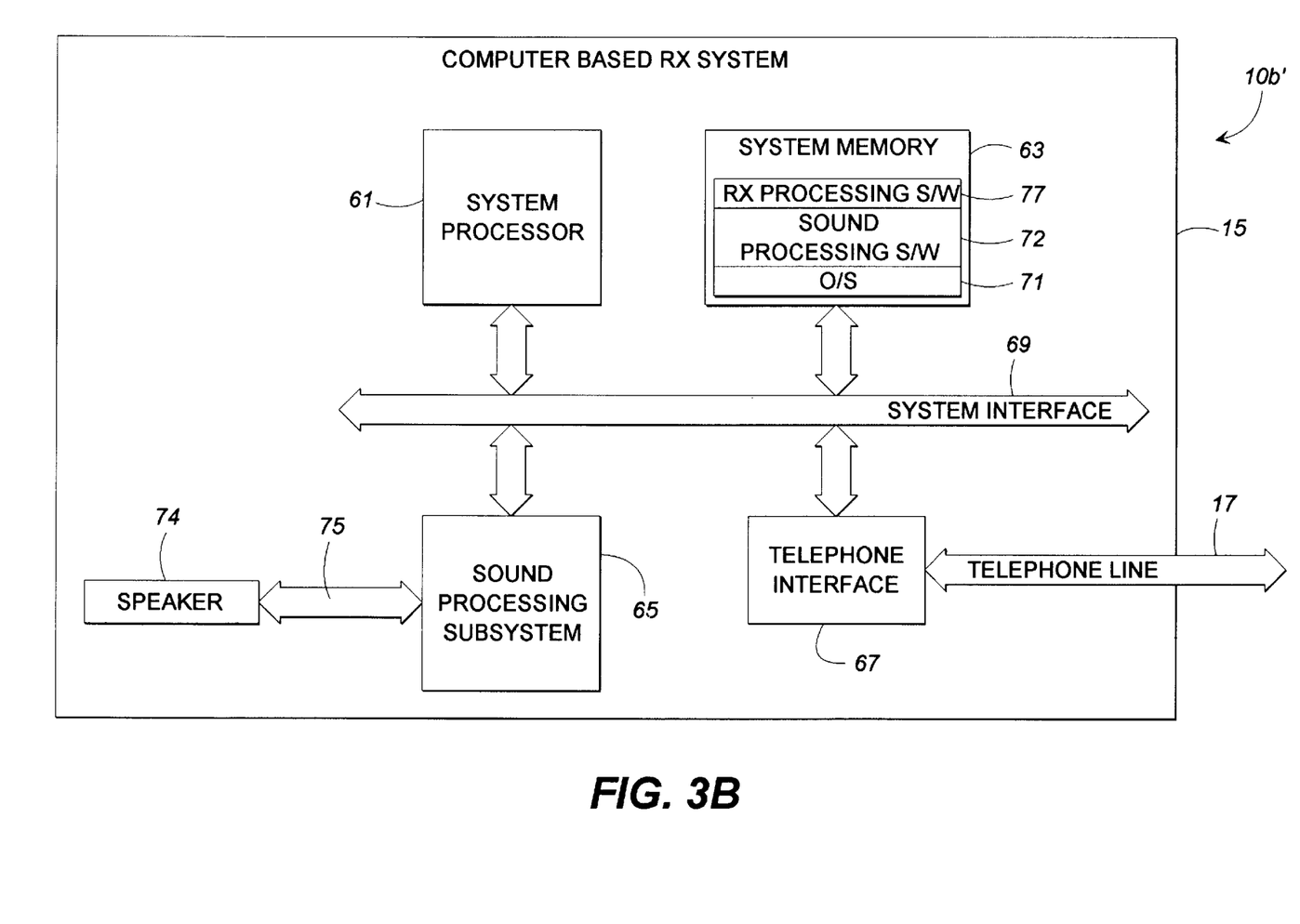
FIG. 3B is an electronic block diagram showing a possible implementation of a computer based receiver system.

In structure, the computer based transmitter system 15 of FIG. 3A includes a system processor 61, a system memory 63 (e.g., a random access memory (RAM)) designed to store the software of the computer based transmitter system 13, a sound processor subsystem 65 interconnected with a microphone 64, a telephone interface 67 that is interfacable to the telephone communications channel 17, and a system interface 69 configured to interconnect the system processor 61, the system memory 63, the sound processing subsystem 65, and the telephone interface 67.

The software for driving the system processor 61 and the sound processing subsystem 65 is situated within the system memory 63. In this regard, the system memory 63 includes an operating system (O/S) 71 that is executed by the system processor 61 for driving the computer based transmitter system 13. Sound processing software 72 resides logically and hierarchically over the operating system 71 and is executed by the sound processing subsystem 65 for the purpose of driving the sound processing subsystem to process audio signals. In particular, the sound processing software 72 drives the sound processing subsystem 65 to receive the source audio signal 11a from the audio input interface 19 at the first sample rate, preprocess the signal 11a for storage, and store the signal 11a in the system memory 63. Finally, the software includes transmitter processing software 73 that is configured to implement the filter 27 (FIG. 1) and the translator 29 (FIG. 1).

For purposes of relating the broad concept of the invention as shown in FIG. 1 with the first embodiment of FIG. 3A, it should be mentioned that the audio input interface 19 in FIG. 1 is implemented in FIG. 3A with the combination of the microphone 64 and the sound processing subsystem 65, that the storage device 21 in FIG. 1 is implemented with the system memory 63 in FIG. 3A, that the control mechanism 23 in FIG. 1 is implemented with the combination of the system processor 61 and the sound processing subsystem 65 in FIG. 3A, and that the communications interface 31 in FIG. 1 is implemented with the telephone interface 67 in FIG. 3A.

Structurally, the computer based receiver system 15 of FIG. 3B includes the system processor 61, the system memory 63, the sound processing subsystem 65, the telephone interface 67 interconnectable to the telephone communications channel, and the system interface 69 for interconnecting the foregoing elements. A speaker 74 is interconnected with the sound processing subsystem 65, as indicated by reference arrow 75, for playing the reduced content audio signal 11$f$ (FIGS. 1 and 2). Furthermore, the system memory 63 includes, in addition to the operating system 71 and the sound processing software 72, receiver processor software 77 for implementing the reducer 39 (FIG. 1) and the translator 29' (FIG. 1).

The functionality and architecture of the transmitter processing software 73 (FIG. 3B) and the receiver processing software 77 (FIG. 3B) will now be described with reference to FIGS. 4A and 4B, respectively. In essence, each block in the flow charts of these figures represents a subroutine, software module, or block of executable code.

Figure 4A:
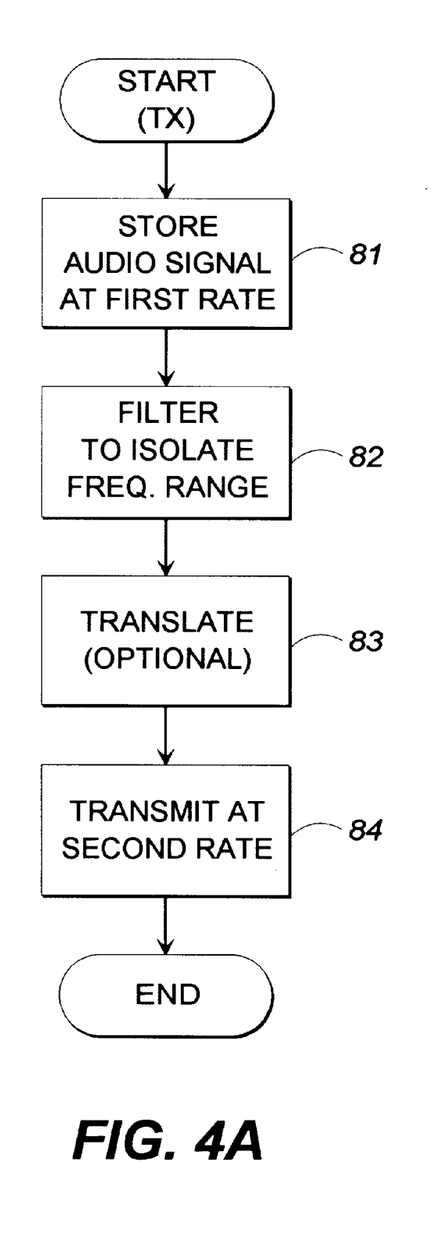
FIG. 4A is a flow chart showing a possible implementation of the transmitter software of FIG. 2A.

With reference to FIG. 4A, as indicated at a block 81, the audio signal 11$a$ is stored or recorded, normally via the combination of the microphone 64, the sound processing subsystem 65, and the system memory 63 (FIG. 3A). As an example, the sound processing subsystem 65 may encode the audio signal 11$a$ at a first sample rate $r_1$ of 11025 hertz (Hz; samples per second; sps) at a normal audio bandwidth (bw) in the approximate range of 100 to 3500 Hz. Industry standard audio files (e.g., "*.wav") may be created with the sound processing subsystem 65 and stored in the system memory 63. Upon completion of the aforementioned task, block 81 transfers to block 82.

At block 82, the audio signal 11$a$ is sharply bandpass filtered to a frequency range of L to (L+B) Hz, where B is approximately 1700 Hz and L is chosen to maximize the audio quality and is, for example, +300 Hz. Many other values of B and L can be chosen. The filtering is performed by a software based filter in the transmitter processing software 73 and generates the signal 11$b$ (FIG. 2). After filtering, the signal 11$b$ exhibits the approximate frequency range of 300 to 2000 Hz, while the sample rate (11025 Hz) remains the same. Block 82 transfers to block 83.

At block 83, the signal 11$b$ is translated to produce the signal 11$c$ (FIG. 2) via the software based translator in the transmitter processing software 73. The signal 11$b$ is frequency translated to approximately 75 to 1775 Hz in the preferred embodiment by shifting the frequency range by about −300 Hz. Note that the sample rate remains at the first sample rate $r_1$ of 11,025 Hz. The translated filtered audio signal 11$c$ (FIG. 2) is stored as a processed audio file (e.g., *.wav) in the system memory 63 by the sound processing subsystem 65. This processed audio signal 11 $c$ is now available for transmission. Note that the processing that takes place at blocks 82 and 83 can take place at any time before transmission, and the processed audio signal 11$c$ can be stored in place of or in addition to the original source audio signal 11$a$, if desired.

When transmission is desired, block 84 is called, and block 84 drives the signal 11$c$ onto the communications channel 17 via the telephone interface 67 (FIG. 3A). Specifically, a telephone connection is established, and the computer based transmitter system 13 plays out the processed audio signal 11$c$ onto the telephone line. Significantly, the signal 11$c$ is played out at a second sample rate $r_2$ that is equal to the first sample rate multiplied by an acceleration value A (AÎÂ) that is greater than one, which is expressed mathematically as follows:

$$r_2 = A * r_1 (\text{Hz.})$$

In the preferred embodiment, the acceleration value A is 2, and thus, the second sample rate $r_2$ is twice the first sample rate $r_1$, or 2*11025=22050 Hz. The resulting signal 11$d$ (FIG. 2), which is transmitted and received, has twice the processed bandwidth, i.e., 150 to 3550 Hz, but requires only about half the time duration for completion of the transmission as compared to transmission of the signal at the first sample rate $r_1$. Note that no start-up time period is required, so the actual improvement in time is truly a factor of 2.

Figure 4B:
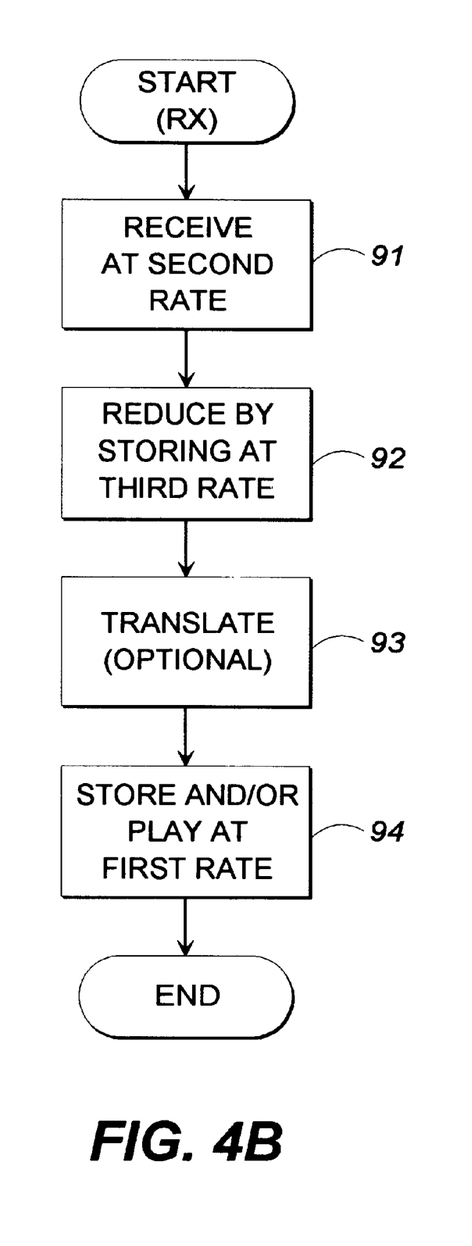
FIG. 4B is a flow chart showing a possible implementation of the receiver software of FIG. 2B.

At the computer based receiver system 15, the audio signal 11$d$ (FIG. 2) is received by the telephone interface 67 and stored in the system memory 63 under the control of software blocks 91 and 92 of FIG. 4B. When the sound processing subsystem 65 of the computer based receiver system 15 stores the signal 11$d$ into the system memory 63, the signal 11$d$ is stored as an audio file at the second rate $r_2$ of about 22,050 Hz and with the approximate bw of 150 to 3550 Hz. In other embodiments, it may be possible to refrain from storing the signal 11$d$ upon receipt, in favor of immediate processing as described hereafter. After receipt, block 91 transfers to block 92 for processing.

At block 92, the audio file is reduced by retrieving the file and restoring it at a third sample rate $r_3$, which is the inversion of the acceleration value A multiplied by the second sample rate $r_2$. In other words, the third sample rate $r_3$ is computed as follows:

$$r_3 = (1/k) * r_2 \text{ (Hz)}$$

Thus, in the preferred embodiment, the third sample rate $r_3 = (\frac{1}{2}) * 22050 = 11025$ Hz. After the reduction step, the approximate bw of the signal 11$e$ is 75 to 1775 Hz.

Next, the audio file is processed by the software based translator in the receiver processing software 77 (FIG. 3B), pursuant to the block 93 of FIG. 4B. In the preferred embodiment, the translate block 93 produces the translated reduced audio signal 11$f$ from the reduced audio signal 11$e$ by shifting the signal 11$f$ along the frequency spectrum by +300 Hz. Thus, the reduced content audio signal 11$f$ is now in the approximate frequency range of 300 to 2000 Hz.

Finally, in accordance with block 94, the reduced content audio signal 11$f$ is stored and/or played at the first sample rate $r_1$ of 11025 Hz. If stored, the signal 11$f$ can be stored as a audio file.

In conclusion, the preferred embodiment achieves a transmission duration improvement of a factor of 2, at a cost or reducing audio bandwidth by about ½. It is straightforward to use other ratios. For example, an improvement of a factor of 1.5 can be realized with a bandwidth reduction of about ⅔.

Note that it is not necessary to listen to the received audio signal 11$d$ at its original time duration. By using interpolation/dissemination techniques, the audio signal can be played at faster than the original audio signal 11$a$. The rate can furthermore be varied during the listening session to permit scanning for particularly important passages.

It is feasible to further reduce transmission time by replacing silent periods with shorter duration coded signals that can be detected at the receiver system 15. Dual tone frequency modulation (DTFM) would be an example.

Finally, note that it is possible to employ variable acceleration values A. When variable acceleration values are employed, the transmitter system 13 can advise the receiver system 15 of the acceleration value A that has been utilized by the transmitter system 13 by encoding $r_1$ and/or $r_3$ in the transmitted signal 11d.

Second Embodiment

Figure 5:
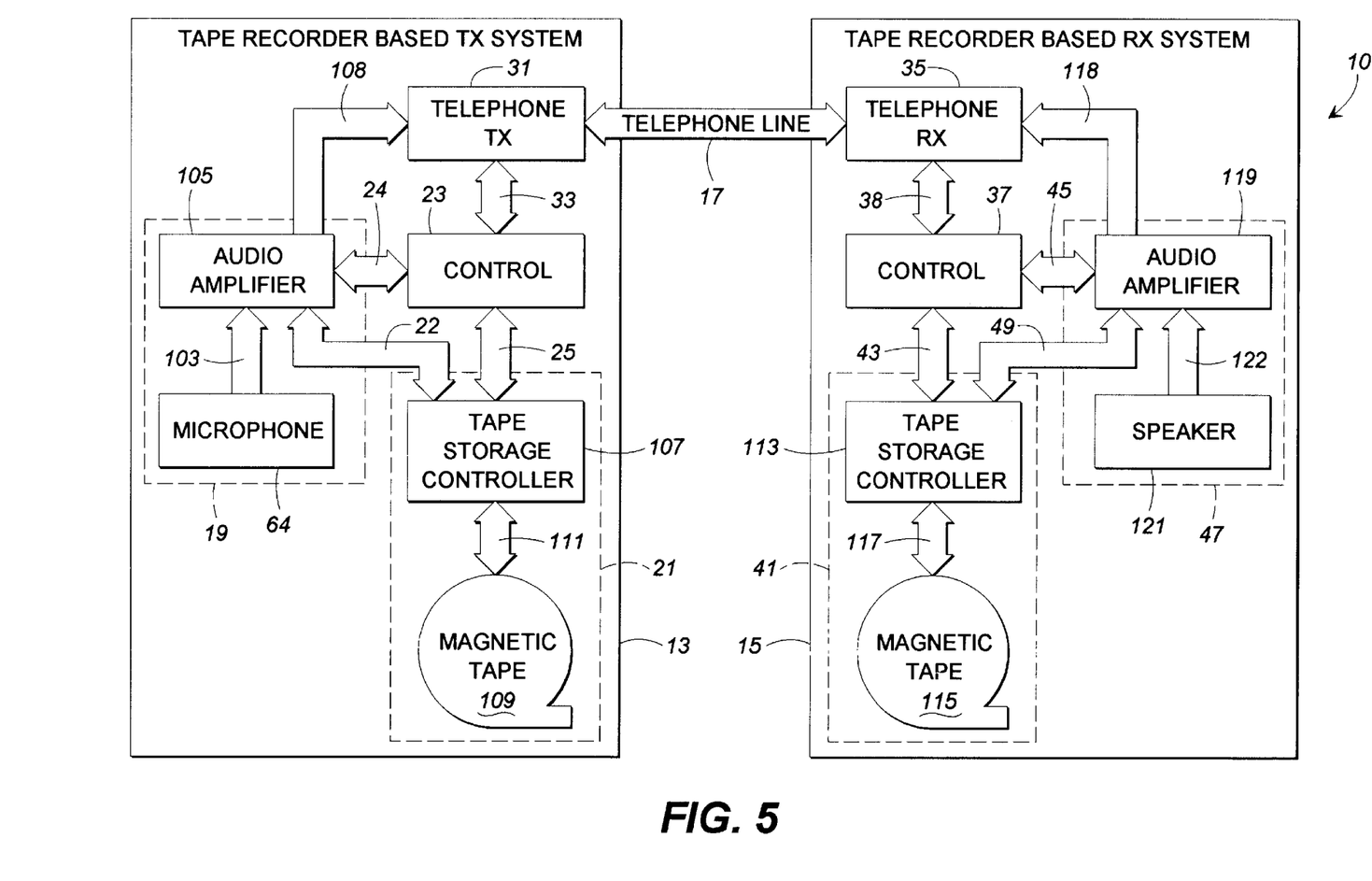
FIG. 5 is an electronic block diagram of a second embodiment of the signal transfer acceleration system of FIG. 1, wherein tape recorder based transmitter and receiver systems are utilized to communicate over a communications channel.

A second embodiment of the signal transfer acceleration system 10 (FIG. 1) is illustrated by way of an electronic block diagram in FIG. 5 and generally denoted by reference numeral 10". The second embodiment constitutes another possible implementation of the invention. The signal transfer acceleration system 10" of FIG. 5 utilizes a tape recorder based transmitter system 13 and a tape recorder based receiver system 15. For purposes of simplicity, the discussion previously regarding components having like reference numerals to those set forth in FIG. 5 is incorporated herein by reference.

The tape recorder based transmitter system 13 includes a microphone 64 for receiving the source audio signal 11a (FIGS. 1 and 2) and for transforming the signal 11a into an electrical format on connection 103. The electrical signal 11a on connection 103 is passed to an audio amplifier 105, which processes the signal 11a and passes the signal 11a on connection 22 to storage in the storage device 21. Note that the audio input interface 19 of FIG. 1 is generally implemented with the combination of the microphone 64 and audio amplifier 105 in FIG. 5.

Referring again to FIG. 5, the storage device 21 includes a tape storage controller 107 that is designed to store and read data to and from a magnetic tape 109, as indicated by reference arrow 111. The tape storage controller 107 receives the electrical signal on connection 23 from the audio amplifier 105 and is controlled by the control mechanism 23, as indicated by reference arrow 25. The tape storage controller 107 stores the signal 11a at any suitable first sample rate $r_1$, for example but not limited to, 1.2 cm/s or 2.4 cm/s.

The control mechanism 23 employs the filter 27 and perhaps the translator 29. In the preferred embodiment, the control mechanism 23 controls the audio amplifier 105 to filter and optionally translate the signal 11a while being recorded onto the tape 109, or alternatively, controls the audio amplifier to initially store the signal 11a and then retrieve it at a later time for processing. If retrieved at a later time, the signal may be processed and then stored once again in either the forms 11b or 11c, or transmitted immediately after processing.

To produce and transmit the signal 11d (FIG. 2), the signal 11b or 11c is communicated from the tape storage controller 107, through the audio amplifier 105, and through the telephone transmitter 31, all of which are controlled by the control mechanism 23. The tape storage controller 107 is controlled by the control mechanism 23 to play out the signal 11b or 11c at a faster second sample rate $r_2$, such as (a) 2.4 cm/s in the case when the first sample rate $r_1$ is 1.2 cm/s and the acceleration value A is 2 or (b) 4.8 cm/s in the case when the first sample rate $r_1$ is 2.4 cm/s and the acceleration value A is 2. Thus, the signal 11d is realized along the telephone communications channel 17.

The tape recorder based receiver system 15 includes a similar storage device 41 having a tape storage controller 113 capable of interfacing with a magnetic tape 115, as indicated by reference arrow 117. The tape storage controller 113 is controlled by the control mechanism 37, as indicated by reference arrow 43.

The incoming signal 11d is stored by the tape storage controller 113 on the magnetic tape 115 by being communicated through the telephone receiver 35, connection 118, audio amplifier 119, connection 49, and tape storage controller 113. The tape storage controller 113 stores the signal 11d at the second sample rate and then restores it at the third sample rate, such as (a) 1.2 cm/s in the case when the second sample rate $r_2$ is 2.4 cm/s and the acceleration value A is 2 or (b) 2.4 cm/s in the case when the second sample rate $r_2$ is 1.2 cm/s and the acceleration value A is 2. Note that it is possible to utilize multiple encoding heads in the tape storage controller 113 so that the signal 11d is stored, read, processed, and then restored in a continuous operation as the tape is advanced during a single cycle.

To play the reduced content signal 11f, the tape storage controller 113 is designed to provide an electrical signal on connection 49 to the audio amplifier 119 at the first rate $r_1$, such as 1.2 cm/s or 2.4 cm/s. The audio amplifier 119 processes the reduced content audio signal 11f and drives it to a speaker 121 so that the signal 11f can be heard, by perhaps, a transcriber.

It should be noted that the first and second embodiments of the signal transfer acceleration system 10 (FIG. 1) can be modified so that a computer based system transmits to a tape recorder based system, or vice versa.

Many variations and modifications may be made to the preferred embodiment of the invention as described previously. All such modifications and variations are intended to be included herein within the scope of the present invention, as is defined by the following claims.

Finally, in the claims hereafter, the structures, materials, acts, and equivalents of all "means" elements, "logic" elements, and steps are intended to include any structures, materials, or acts for performing the functions specified in connection with said elements.

Wherefore, the following is claimed:

1. A method for accelerating transfer of an audio signal through a communications channel, comprising the steps of:

storing said audio signal at a first sample rate;

reducing a frequency range of said signal by filtering frequencies from said signal;

transmitting said signal along said communications channel at a second sample rate that is faster than said first sample rate so that said frequency range is expanded while a time period of said transfer is reduced;

receiving said signal from said communications channel;

storing said signal at a third sample rate so that said frequency range is restored;

playing said signal at said first sample rate.

2. The method of claim 1, wherein said second rate is equal to an acceleration value that is greater than one multiplied by said first rate and wherein said third rate equal to an inversion of said acceleration value multiplied by said second rate.

3. The method of claim 1, further comprising the step of transmitting and receiving said signal respectively to and from a telephone line.

4. The method of claim 1, wherein said storing steps include the step of storing said signal on a magnetic tape.

5. The method of claim 1, wherein said storing steps include the step of storing said signal on a computer readable medium.

6. The method of claim 1, further comprising the steps of:
   translating said signal by shifting said signal along said frequency domain prior to said transmitting step; and
   translating said signal by shifting said signal along said frequency domain after said receiving step in order to nullify said translating step prior to said transmitting step.

7. The method of claim 1, further comprising the step of encoding a rate indicator in said signal prior to said transmitting step that is indicative of said second sample rate; and
   decoding said rate indicator after said receiving step.

8. The method of claim 1, wherein said step of playing includes the step of transferring said signal from a magnetic tape to a speaker.

9. The method of claim 1, wherein said step of playing includes the step of transferring said signal from a computer readable medium to a speaker.

10. A method for accelerating transfer of an audio signal through a communications channel, comprising the steps of:
    storing said audio signal;
    reducing a frequency range of said signal by filtering frequencies from said signal;
    transmitting said signal along said communications channel so that said frequency range is expanded while a time period of said transfer is reduced;
    receiving said signal from said communications channel;
    storing said signal so that said frequency range is restored; and
    playing said signal.

11. A transmitting method for accelerating transfer of an audio signal through a communications channel, comprising the steps of:
    storing said audio signal at a first sample rate;
    reducing a frequency range of said signal by filtering frequencies from said signal; and
    transmitting said signal along said communications channel at a second sample rate that is faster than said first sample rate so that said frequency range is expanded while a time period of said transfer is reduced and so that said signal can be reproduced in part by a receiver by storing said signal at a third sample rate that restores said frequency range and by playing said signal at said first sample rate.

12. A receiving method for accelerating transfer of an audio signal through a communications channel, comprising the steps of:
    receiving said audio signal from said communications channel, said audio signal having been stored at a first sample rate, reduced along a frequency domain, and transmitted at a second sample rate that is faster than said first sample rate so that said signal has been expanded in said frequency domain while a time period of said transfer is reduced;
    storing said signal at a third sample rate that restores said frequency range; and
    playing said signal at said first sample rate.

13. A system for accelerating transfer of an audio signal through a communications channel, comprising:
    (a) a communications channel;
    (b) a transmitter system connectable to said communications channel and having:
       (1) a transmitter storage device configured to store said audio signal at a first sample rate;
       (2) a filter configured to reduce a frequency range of said signal by filtering frequencies from said signal;
       (3) a transmitter configured to transmit said signal along said communications channel at a second sample rate that is faster than said first sample rate so that said frequency range is expanded while a time period of said transfer is reduced; and
    (c) a receiver system connectable to said communications channel and having:
       (1) a receiver configured to receive said signal from said communications channel;
       (2) a receiver storage device configured to store said signal at a third sample rate that restores said frequency range; and
       (3) a playback mechanism configured to play said signal at said first sample rate.

14. A system for accelerating transfer of an audio signal through a communications channel, comprising:
    (a) a communications channel;
    (b) a transmitter system connectable to said communications channel and having:
       (1) a transmitter storage device configured to store said audio signal;
       (2) a filter configured to reduce a frequency range of said signal by filtering frequencies from said signal;
       (3) a transmitter configured to transmit said signal along said communications channel so that said frequency range is expanded while a time period of said transfer is reduced; and
    (c) a receiver system connectable to said communications channel and having:
       (1) a receiver configured to receive said signal from said communications channel;
       (2) a receiver storage device configured to store said signal and restore said frequency range; and
       (3) a playback mechanism configured to play said signal.

15. The system of claim 14, wherein said second rate is equal to an acceleration value that is greater than one multiplied by said first rate and wherein said third rate is equal to an inversion of said acceleration value multiplied by said second rate.

16. The system of claim 14, wherein said communications channel is a telephone line.

17. The system of claim 14, wherein said transmitter and receiver storage devices comprise a means for storing said signal on magnetic tape.

18. The system of claim 14, wherein said transmitter and receiver storage devices comprise a means for storing said signal on a computer readable medium.

19. The system of claim 14, wherein said transmitter system further comprises a transmitter translator configured to translate said signal by shifting said signal along said frequency domain prior to transmission and wherein said receiver system further comprises a receiver translator configured to translate said signal by shifting said signal along said frequency domain after signal reception in order to nullify said translation at said transmitter system.

20. The system of claim 14, further comprising:
    means associated with said transmitter system for encoding a rate indicator in said signal that is indicative of said second sample rate; and
    means associated with said receiver system for decoding said rate indicator.

21. The system of claim 14, wherein said playback mechanism is configured to transfer said signal from a magnetic tape to a speaker.

22. The system of claim 14, wherein said playback mechanism is configured to transfer said signal from a computer readable medium to a speaker.

23. A transmitter system for accelerating transfer of an audio signal through a communications channel, comprising:

- a storage device for storing an audio signal at a first sample rate;
- a filter configured to reduce a frequency range of said signal;
- a transmitter configured to transmit said signal at a second sample rate that is faster than said first sample rate so that said frequency range is expanded while a time period to transmit is reduced;
- whereby said signal can be reproduced in part by a receiver by storing said signal at a third sample rate that restores said frequency range and playing said signal at said first sample rate.

24. A receiver system for accelerating transfer of an audio signal through a communications channel, comprising:

- a receiver configured to receive said signal from said communications channel, said signal having been originally sampled at a first sample rate, filtered to reduce a frequency range of said signal, and transmitted along said communications channel at a second sample rate that is faster than said first sample rate so that said frequency range is expanded while a time period of said transfer is reduced;
- a receiver storage device configured to store said signal at a third sample rate that restores said frequency range; and
- a playback mechanism configured to play said signal at said first sample rate.

* * * * *